United States Patent
Wickboldt et al.

(10) Patent No.: US 12,399,062 B2
(45) Date of Patent: Aug. 26, 2025

(54) SYSTEM AND METHOD FOR USING AN IMAGE SENSOR HAVING IMAGE PIXELS AND SPECTRAL PIXELS

(71) Applicant: OmniVision Technologies, Inc., Santa Clara, CA (US)

(72) Inventors: Paul Wickboldt, Walnut Creek, CA (US); Ramakrishna Kakarala, Santa Clara, CA (US); Jau-Jan Deng, Taipei (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 249 days.

(21) Appl. No.: 18/106,928

(22) Filed: Feb. 7, 2023

(65) Prior Publication Data

US 2024/0263997 A1    Aug. 8, 2024

(51) Int. Cl.
*G01J 3/28* (2006.01)
*G06T 5/20* (2006.01)
*G06V 40/12* (2022.01)

(52) U.S. Cl.
CPC ............. *G01J 3/2823* (2013.01); *G06T 5/20* (2013.01); *G06V 40/1365* (2022.01)

(58) Field of Classification Search
CPC ..... G01J 3/2823; G06T 5/20; G06V 40/1365; G06V 40/13; G06V 40/1318; H04N 23/55

See application file for complete search history.

(56) References Cited

U.S. PATENT DOCUMENTS

| | | | | |
|---|---|---|---|---|
| 2016/0373664 | A1* | 12/2016 | Wei | H04N 25/135 |
| 2020/0410202 | A1* | 12/2020 | Lin | G06V 40/1394 |
| 2021/0064842 | A1* | 3/2021 | Östlund | G06V 40/1394 |

OTHER PUBLICATIONS

Z. Wang et al. "*Spectral analysis based on compressive sensing in nanophotonic structures*" Opt. Express vol. 22, 2014, 7 pages.
Y. Zhu et al. "*Compact CMOS spectral sensor for the visible spectrum*" Photonics Research vol. 7, No. 9, 2019, pp. 961-966.

* cited by examiner

*Primary Examiner* — Jonathan M Hansen
(74) *Attorney, Agent, or Firm* — COZEN O'CONNOR

(57) ABSTRACT

A method includes capturing an image from a scene with an image sensor. The image sensor has a plurality of spectral pixels and a plurality of image pixels. The method also includes collecting gathered data from the spectral-imaging array based on the light received. The gathered data is separated into spectral pixel data and image pixel data. The spectral pixel data is provided by the spectral pixels and the image pixel data is provided by the image pixels. The method includes both generating spectral information of the image based on the spectral pixel data and generating image information of the image based on the image pixel data.

12 Claims, 11 Drawing Sheets

SYSTEM AND METHOD FOR USING AN IMAGE SENSOR HAVING IMAGE PIXELS AND SPECTRAL PIXELS

BACKGROUND

Various embodiments relate generally to optical sensor systems, methods, devices and computer programs and, more specifically, relate to optical fingerprint and facial sensors.

Image sensors have various pixels which are used to collect information about the light received. Those pixels can be either image pixels or spectral pixels. Image pixels (or non-spectral pixels) are used to gather information about the image detected. Spectral pixels are pixels that have a response that is dependent on the spectrum of the light, and can be used to discern the actual spectrum (or "color") of the light. However, when spectral pixels and non-spectral pixels are combined into a pixel array of a CMOS sensor, the pixel response may also depend on the location within the image.

Incorporating spectral pixels directly into imager arrays is valuable because it can increase the amount of information gathered. However, there are problems in doing this. For example, each spectral pixel cannot be used for imaging, as the image pattern affects the response of the pixels depending on their location in the image plane.

What is needed is an image sensor that can benefit from the use of both spectral and image pixels.

SUMMARY

The below summary is merely representative and non-limiting.

The above problems are overcome, and other advantages may be realized, by the use of the embodiments.

In a first aspect, an embodiment provides a method for collecting imager data. The method includes capturing an image from a scene with an image sensor. The image sensor has a plurality of spectral pixels and a plurality of image pixels. The method also includes collecting gathered data from the spectral-imaging array based on the light received. The gathered data is separated into spectral pixel data and image pixel data. The spectral pixel data is provided by the spectral pixels and the image pixel data is provided by the image pixels. The method includes both generating spectral information of the image based on the spectral pixel data and generating image information of the image based on the image pixel data.

In another aspect, an embodiment provides an image sensor. The image sensor includes a pixel array having a plurality of spectral pixels and a plurality of image pixels and a processor. The processor is configured to receive gathered data from the spectral-imaging array and separate the gathered data into spectral pixel data and image pixel data. The spectral pixel data is provided by the spectral pixels and the image pixel data is provided by the image pixels. The processor is also configured to generate spectral information of the image based on the spectral pixel data and to generate image information of the image based on the image pixel data.

BRIEF DESCRIPTION OF THE DRAWINGS

Aspects of the described embodiments are more evident in the following description, when read in conjunction with the attached Figures.

DETAILED DESCRIPTION

Figure 1:
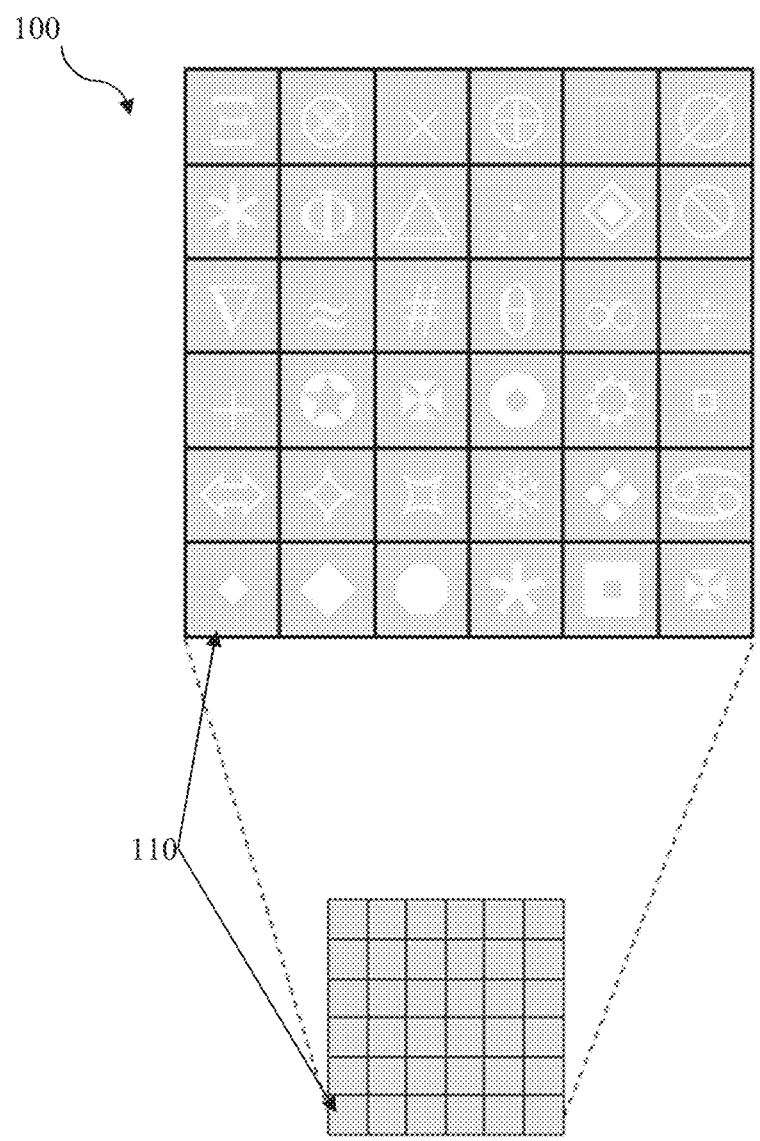
FIG. 1 demonstrates an array of unique pixel designs.

Various embodiments provide image sensors having both image and spectral pixels and methods of using these image sensors. By incorporating the use of both types of pixels in a single sensor, the sensor can gather more information than if it only had a single type of pixel. This additional information can be used to supplement the image data and/or to improve image recognition.

Diffractive nanostructures (e.g., photonic crystals) can be used over CMOS pixels to create spectrum-dependent responses. The response of these spectral pixels can be used to calculate the spectrum of light. However, using spectral pixels can create issues if the spectral pixels are not accounted for. Otherwise, the spectral pixels appear to create artifacts in the image as their response is related to the color spectrum of the light rather than providing image data. In some situation, such as in fingerprint sensors, the image is over-sampled and such issues can be corrected.

In conventional pixel arrays, the final image resolution is much lower than pixel resolution. The final image may be binned with 3×3 sets of pixels with a smoothing (anti-aliasing) filter applied. This scheme assures removal of moiré patterns when imaging through displays.

When combining image and spectral pixels, the final image can have sufficient resolution even with the removal of the spectral pixels. This allows the combination array to gain additional spectral data without sacrificing image quality and improving the ability to authenticate/identify a fingerprint.

Various embodiments provide image sensor designs and methods of operation to remove this image dependency, which enable the use of spectral pixels within the pixel array. Another problem with using spectral pixels is that calibration, which may be used to ensure pixel output is properly correlated to the image/spectral information, may be dependent on module-level variations (for example, with optical fingerprint sensors located under a display the calibration may be performed for each phone assembly as the pixel responses can be affected by many manufacturing non-uniformities). Enabling module-level calibration is onerous and impractical for large volume production. In contrast, various embodiments offer a method to remove the effect of these non-uniformities and enable an effective "one-time" calibration for many devices.

Photonic nanostructures may be fabricated on the upper layers of CMOS sensor pixels to discern the spectrum of light incident on the image sensor. In some cases, the nanostructures used are photonic crystals, though other types of designs could be used. Multiple unique nanostructure designs are available, and each design causes a different spectral response of the pixel to the light. By combining the responses of these different nanostructured pixels, it is possible to discern the spectral information of the light. It is possible, for example, to re-create the entire spectrum of light if there are enough unique spectral pixels with unique spectral responses.

FIG. 1 demonstrates an array 100 of unique pixels 110. Each pixel 110 is shown with a respective symbol to demonstrate that each pixel 110 has a respective design and an associated respective spectral response, Ii that differs from the spectral response of each other pixel 110. Pixel responses may be transformed by using an algorithm to calculate the spectrum of incident illumination (see below).

Spectral pixels 110 each have a unique design and spectral response. These responses depend on the spectrum of incident illumination and the response of each pixel can be different. When properly designed, each pixel has a different response pattern. The spectral information, which is the spectrum of incident illumination, can then be determined by an algorithm. The resolution of the spectrum obtained depends on the number of unique spectral pixels. Without the use of information compression, for example, a spectrum from 430 nm to 570 nm, could use 36 values for a resolution of every 4 nm wavelength. Typically, dozens of unique designs are used to create a meaningful spectrum.

CMOS image sensors can incorporate various embodiments so that both image and the spectral information, which is the spectrum of incident illumination, can be determined simultaneously. For biometric applications such as fingerprint or facial recognition, the spectrum of incident illumination, which may be the spectral content of the finger or the face, can be used to create additional information from which to match an identity or detect a fake. Another use is for food inspection where spectral information may be used to detect spoilage, or for inspection of color in manufactured parts.

Figure 2:
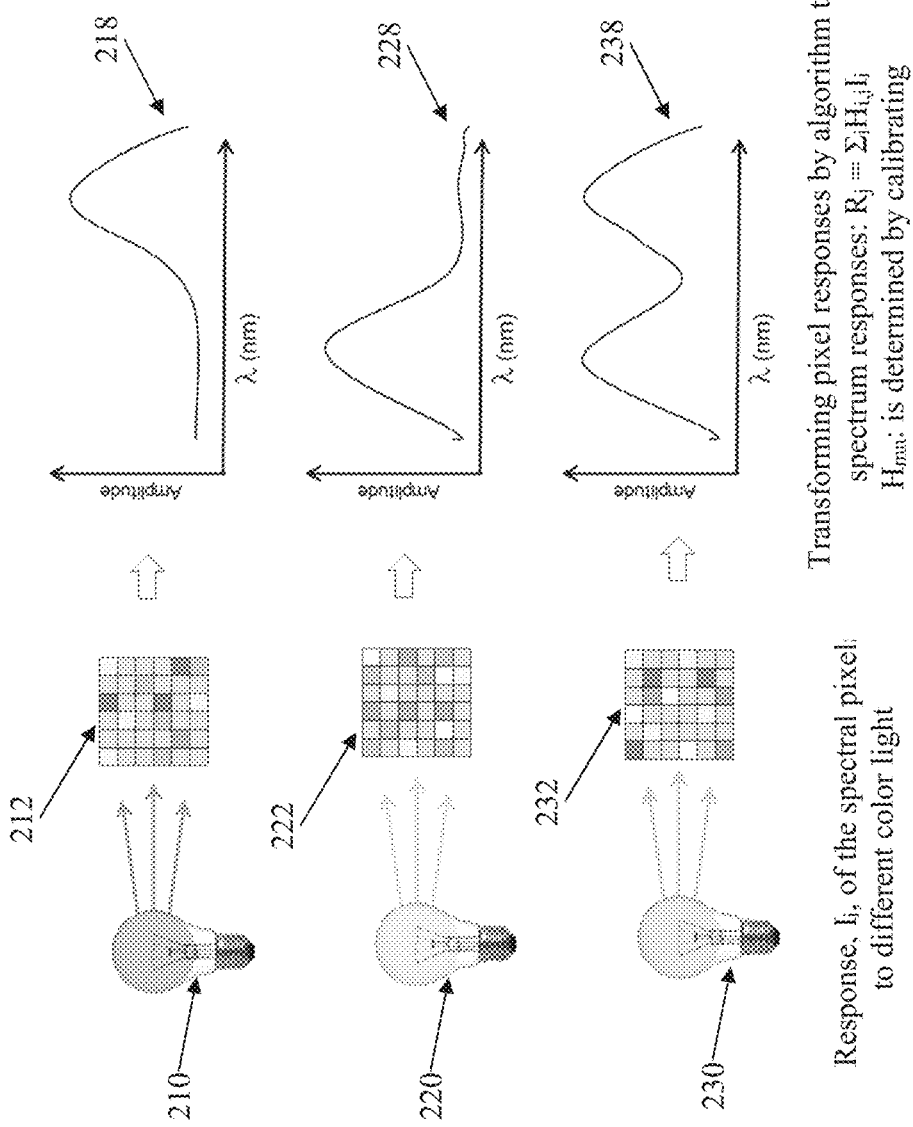
FIG. 2 illustrates responses of spectral pixels to different colored light.

FIG. 2 illustrates responses 218, 228, 238 of spectral pixels 212, 222, 232 to different colored light, such as red 210, green 220, and yellow 230, as in a CMOS sensor. There are several challenges toward incorporating spectral pixels directly into a CMOS sensor. The information from the various spectral pixels, i, is collected as pixel response, $I_i$, and a transformation of the pixel response $I_i$ is performed by using an algorithm to find the spectrum of incident illumination $R_j$, e.g., from 430 nm to 570 nm with resolution of every 4 nm.

Since the spectral pixel response ($I_i$) is dependent on the light's spectrum ($R_j$), its response is not reliably available for image information. As such, spectral pixels do not contribute image information. This can deteriorate the image information for a given CMOS pixel array and may be similar to having a defective pixel.

Additionally, the spectral pixel response ($I_i$) can be affected by the pixel's location within the image. Each spectral pixel's response depends on whether the pixel is located in a darker or lighter region of the image, such as, of a fingerprint or face. In these cases, the spectral and image pixel functions are incompatible.

A further challenge is associated with calibration of spectral pixels. Even when there is uniform illumination, the image background can cause nonuniformities across the pixel array, and the spectral pixels should be calibrated to account for this. Depending on the system, this calibration can be onerous or not possible. Additionally, background noise may even be caused by light transmission through an OLED display backplane. This background noise is different for each phone assembly and can change with every use of the sensor. Calibrating for this background response is not practical, and other approaches are sought.

In one non-limiting embodiment, a first approach relies on the desired image being of lower resolution that the pixel array resolution. Put another way, the image is oversampled. This is the case for fingerprint CMOS sensors. In fingerprint sensors, the pixel resolution is 3× or greater than that used for the final image. For this reason, the images are usually binned in order to reduce the amount of data.

Figure 3:
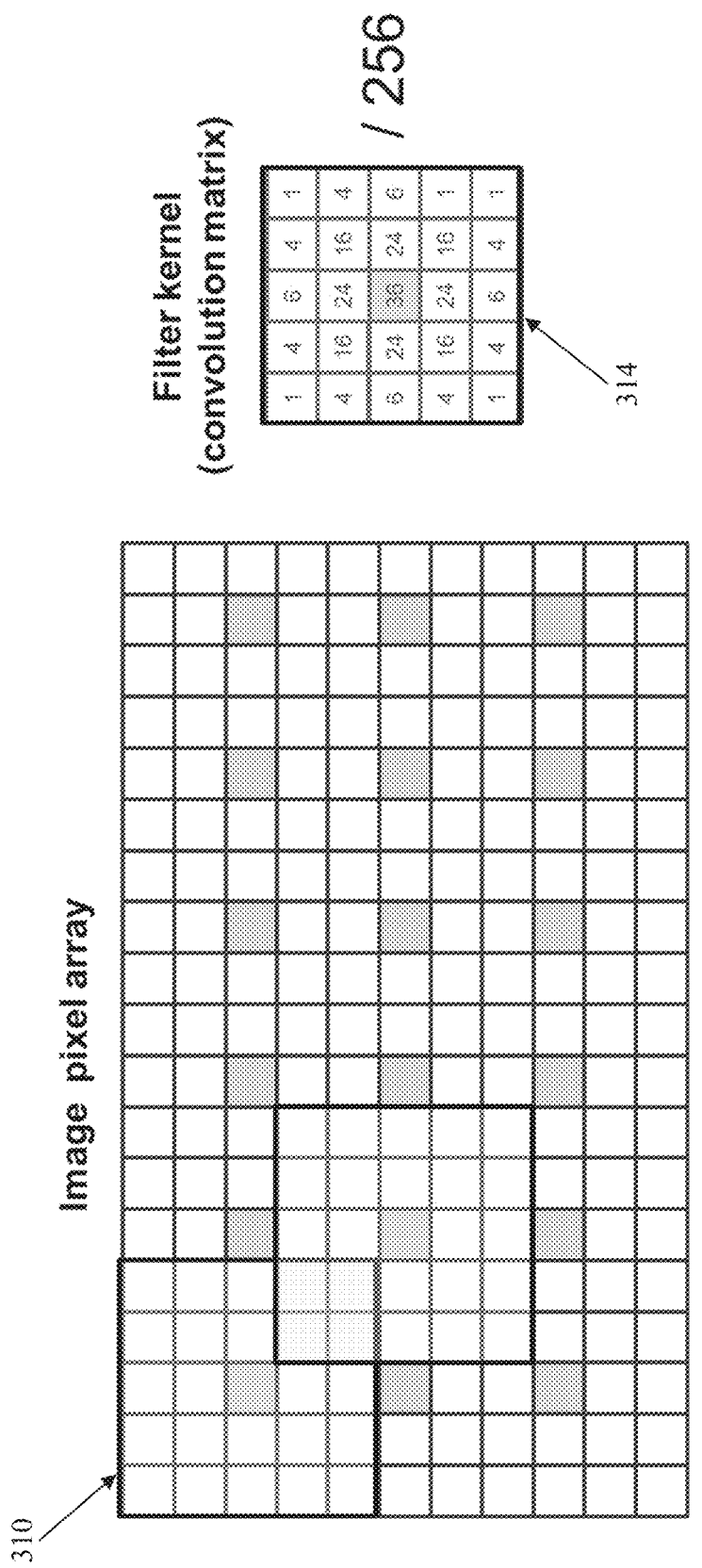
FIG. 3 illustrates an example of an image pixel array and a filter kernel.

FIG. 3 illustrates an image pixel array 310 and a filter kernel 314. During the binning process, the image is filtered with a binning kernel 314, which helps smooth the image and prevent any aliasing artifacts.

White pixels (image pixels) are used for detecting images, such as a fingerprint. The image pixels do not use a color filter, thus the detected image may be a grayscale image. Gray pixels may be used for collecting spectral information to examine if the finger of the detected fingerprint is fake or real finger, by looking at the spectrum of incident illumination, which may be light reflected from the finger.

The value detected at the spectral pixel is not used as a value for the image, because it is covered by a specific color filter, or it is made using specific techniques mentioned above. The image value at the spectral pixel is calculated with the convolution kernel and the center of the kernel is placed at the spectral pixel.

In FIG. 3, the binning is 3×3 with a gaussian type 5×5 filter, though other combinations, including 2×2 binning with 3×3 filters, etc. may be employed. Under these circumstances, it is possible to remove one of the pixels from the binning/filter process so that it does not contribute to the image. This is illustrated in FIG. 4 for 3×3 binning.

Figure 4:
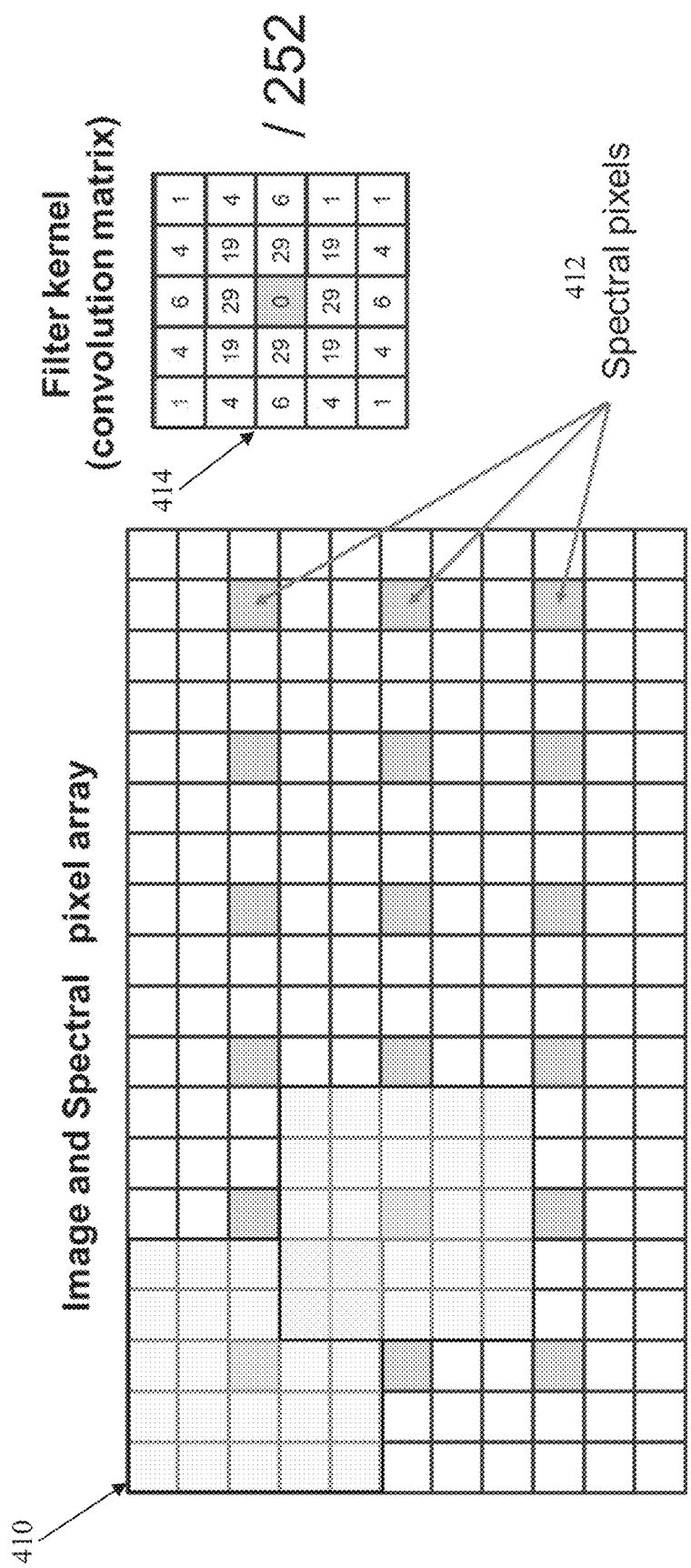
FIG. 4 illustrates another example of an image pixel array with spectral pixels and a filter kernel.

FIG. 4 shows an image pixel array 410 with spectral pixels 412 and a filter kernel 414. In this case, filter kernel 414 has been adjusted to remove the center pixel (here, spectral pixels 412) from the binning summation and replace it with a weighted average of the surrounding pixels. Using this new filter kernel, the final binned image is still formed with the same resolution as before, albeit with a reduction in total response.

Spectral pixels 412 can be assigned to the pixels that have been remove from the image formation. Effectively, two frames of information can be read-out simultaneously, an image frame and a spectral frame. As shown the center of the kernel is zero so that the original value at the spectral pixel is neglected.

By performing the convolution with the center of the kernel at the spectral pixel, skipping every two image pixels will result in "down sampling" from 504×504 pixels to 168×168 pixels (504/3=168). This "down sampling" may also be considered as "binning"; however, this type of "binning" is not the same as the "binning" which is the summation of several pixels to be one pixel.

The example illustrated is based on the operation of a current CMOS sensor, which has an array of 504×504 image pixels and can be binned 3×3 to a frame of 168×168. These numbers allow 28 k pixels to be available as spectral pixels.

The large number of spectral pixels across the entire image area enables another benefit: averaging of pixels at locations across the image can eliminate the dependency of the spectral pixel responses on the image. This allows the distribution of hundreds of each type of spectral pixel across the entire image area. Any response variations due to the image variations can be effectively removed. The means that the response for each type of spectral pixel is independent of the background response pattern or the image. The response can be calibrated for the average value of each type of spectral pixel. This averaged response is less dependent on manufacturing variations, allowing calibration at an earlier stage of the manufacturing process, possibly on a wafer or lot level, and enabling even a single level of calibration for all devices.

Figure 5:
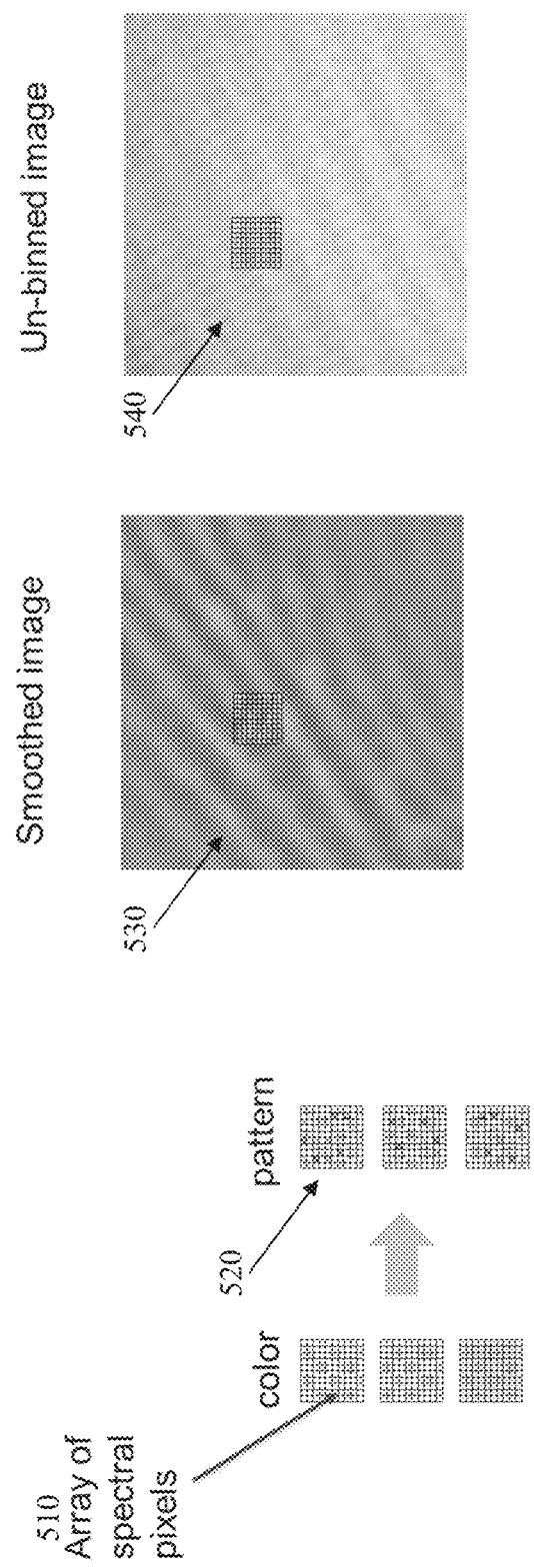
FIG. 5 shows an example of an array of spectral pixels used to determine a unique pattern of response in both a smoothed image and an un-binned image.
Figure 6:
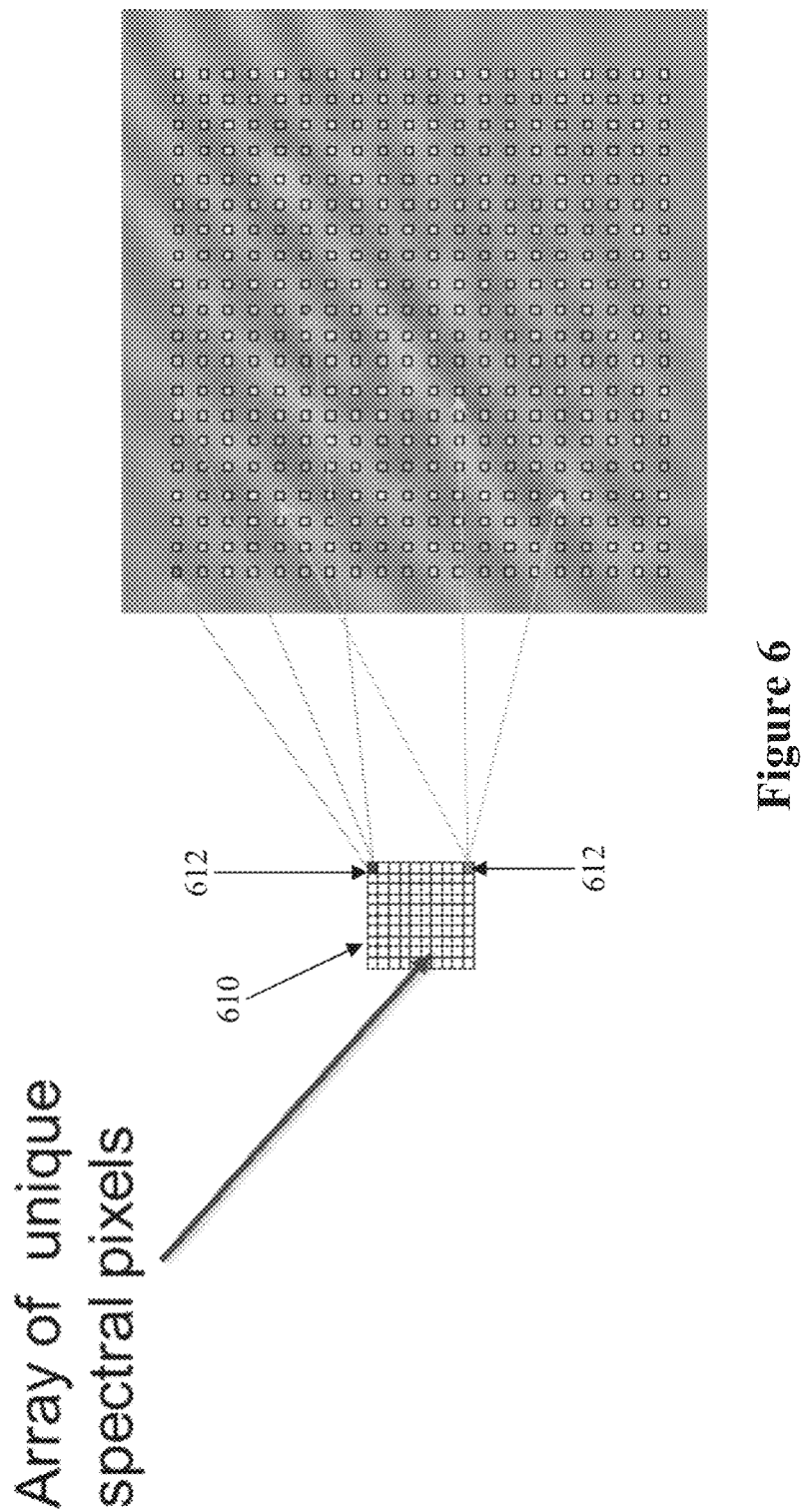
FIG. 6 shows an example of an array of spectral pixels.

FIG. 5 shows an array of spectral pixels 510 used to determine a unique pattern 520 of responses in both a smoothed image 530 and an un-binned image 540. FIG. 6 shows an array 610 with spectral pixels 612. The spectral response from spectral pixels 612 may be accounted for using the techniques described above in order to provide image data from the remaining pixels in array 610.

In another non-limiting embodiment, a second approach takes advantage of the highly distorted image that occurs in camera-cube-chip (CCC) technology which is used for fingerprint sensors due to low cost and small footprint.

Figure 7:
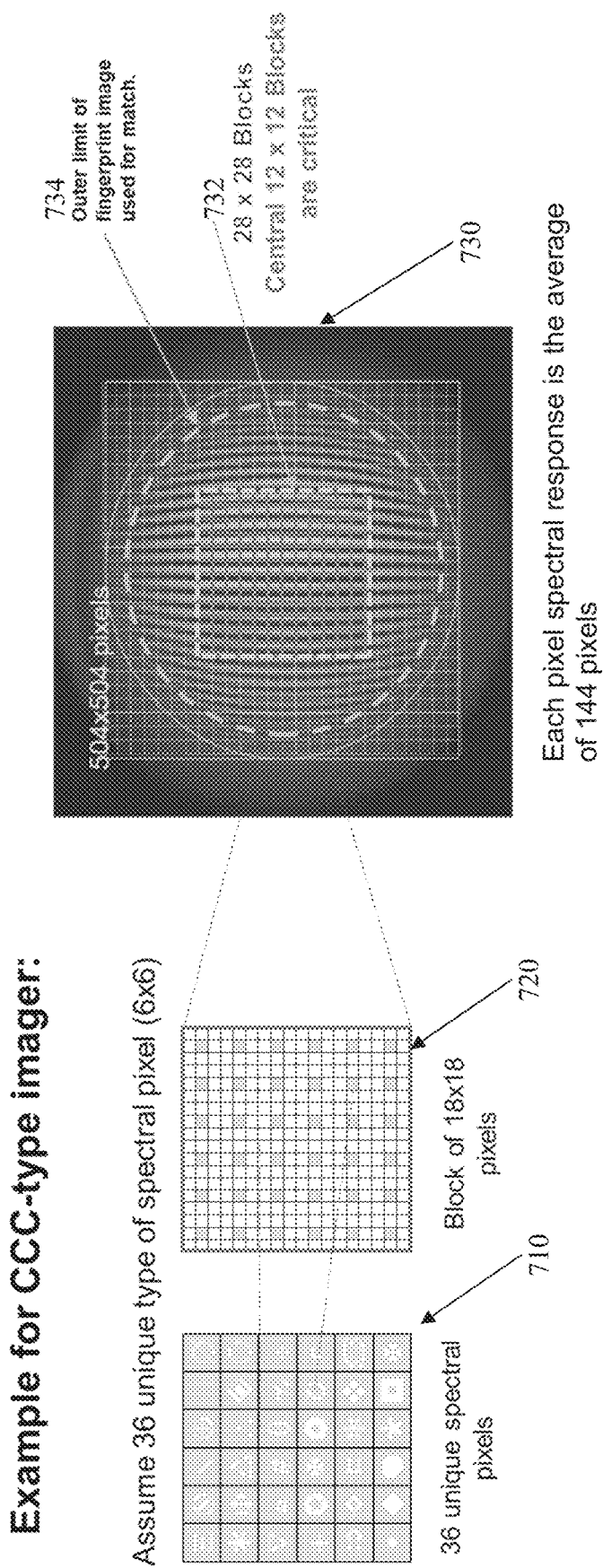
FIG. 7 demonstrates an example of a CCC-type imager.

FIG. 7 demonstrates an example of a CCC-type imager. Various spectral pixels 710 are located within array 720. Array 720 provides pixel information 730. The useful image area is noted as within circle 734, and the final image is processed from this region. This circle 734 corresponds to a circle of diameter approximately 6.4 mm on the object finger. However, there is still a sensor response from the light of the object even outside this circle 734 in the four quadrants inside the larger square.

Much of these outer regions show a smoothed pattern of light with a response that starts of at ~40% of the central image response, and drops-off as the radius increases from the central block 732. There is no image information in this region because the image focus suffers from large coma aberrations and the local de-magnification decreases dramatically so that even large image features are merged and smoothed. However, while the pixels in this location are not useful for image formation, they can be useful for spectral information.

In this approach, the spectral pixels are located in the outer non-imaging locations of the CMOS array. Since these are not needed for imaging, all of them can be used for the purposes of spectral response. Because of the large image distortion, these peripheral pixels represent much larger radii of the object (finger), and it can assess that the light entering these locations comes from the desired object location.

The central image region inside circle 734 represents a circle of approximately 6.4 mm diameter at the finger location, and the peripheral pixels represent a circular region with an inside diameter of 7.8 mm and outer diameter of 10.0 mm at the finger object plane. In circumstances where the finger is shifted to one side or another, one or two of the peripheral quadrants shown may not be covered, but the information is still available from the remaining quadrants which provides redundancy.

Based on the regions specified, there are many spectral pixels in each quadrant for spectral detection. With this large number of pixels available, it is possible to take average values for the responses of each type of spectral pixel. This averaging means that the responses are independent of image background and image-to-image variations. Additionally, this enables calibration at an earlier stage of manufacturing.

For fingerprint devices with CCC modules, the second approach has an added advantage: the fingerprint sensors can use an IR cut filter (IRCF) to remove the effects of ambient light on the image quality. However, this IRCF removes the red light, which can be an important spectrum range to detect real human fingers.

Figure 8:
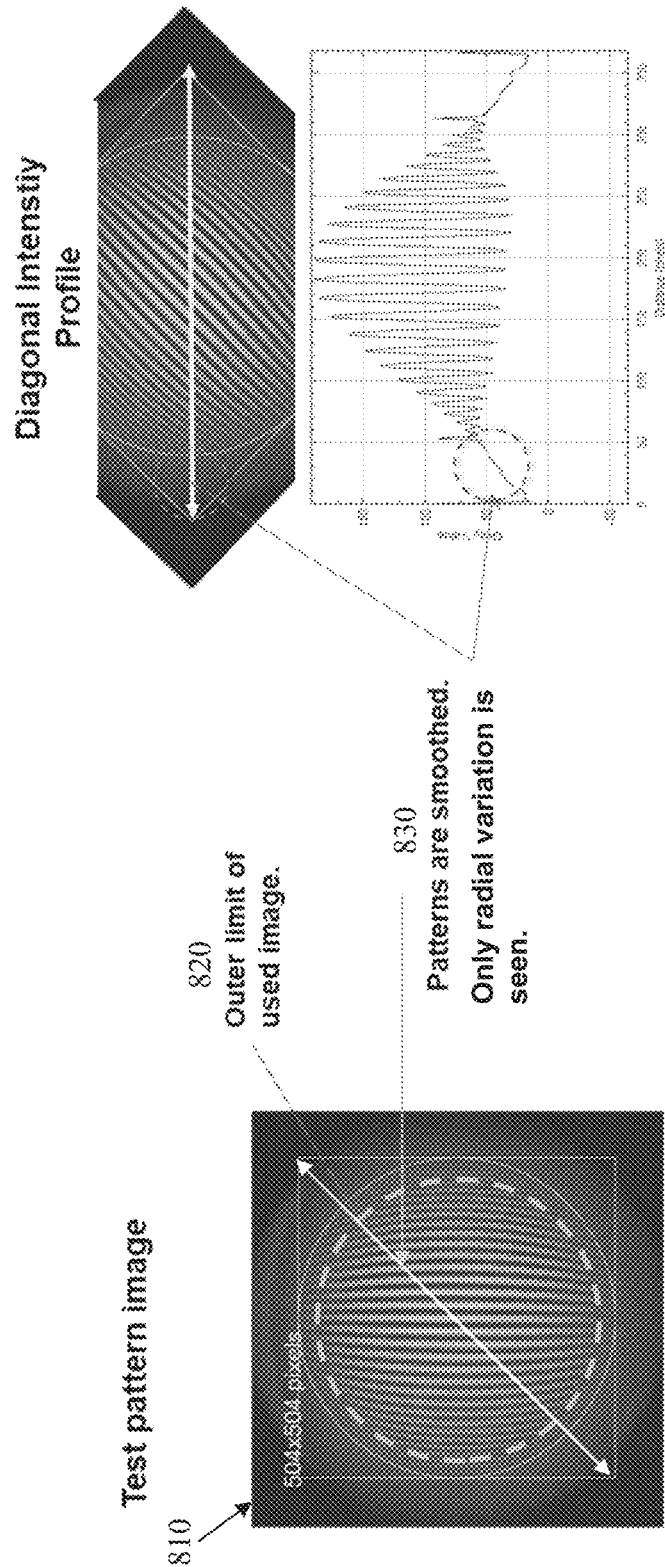
FIG. 8 demonstrates an example using a test pattern image.

FIG. 8 demonstrates an example using a test pattern image. Array 810 includes various pixels for image information. These pixels are located within circle 820. A diagonal intensity profile 830 shows that the patterns are smoothed, and only radial variation is seen.

Figure 9:
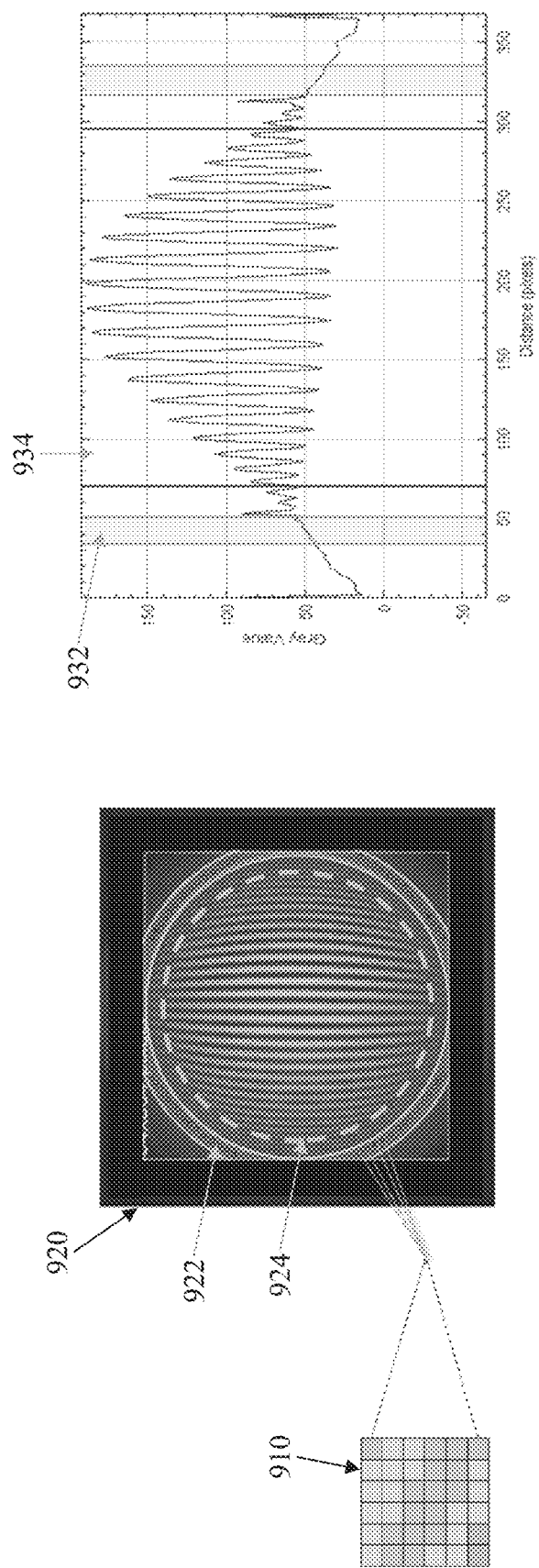
FIG. 9 demonstrates another example using the test pattern image.

FIG. 9 demonstrates another example using the test pattern image. In this example, spectral pixels 910 are located in array 920 in area 922 which is outside the area used for image information (circle 924). This allows the array to get the spectral characteristics of a finger when a fingerprint is imaged in order to examine if the finger is fake or real.

The data in graph 934 includes area 932 which corresponds to the pixels in area 922. As can be seen, the information is regular and does not contribute image information. This means the pixels can be repurposed for spectral information with minimal impact on the image information gained.

In the first approach, the spectral pixels are integrated within the array of imaging pixels, which means that these spectral pixels cannot detect the red light cut off by the IRCF. However, when using the second approach, the spectral pixels are segregated from the imaging pixels, which would allow the IRCF to be removed from the peripheral regions but not the imaging regions. This allows the spectral pixels to also discern the red-light portion of the spectrum, providing stronger detection of fake fingers. For example, an IRCF layer could be added to the sensor, but patterned to cover the region inside the smaller inner circle.

As described in the approaches above, the first approach has the advantage that it can be readily implemented with the binning/filtering approaches already used in these CMOS sensors while the second approach has the advantage that it could remove the IRCF from the locations of the spectral pixels.

The first approach has many variations based on different binning and filtering schemes. To improve sensor response for the image, fewer spectral pixels may be used and replaced with imaging pixels (for example, every 6×6 or 9×9 of the pixels). Also, 2×2 or 4×4 binning may be used depending on the sensor pixel pitch, and filters can be designed to accommodate up to 7×7 binning.

The approaches above use similar techniques to simultaneously gather both spectral information and image information. A filter may be used to remove spectral information from the combined sensor information. The remaining data is used as image information. The image information may be further processed in order to account for the removed data, for example, by replacing the spectral information with a localized average of the image data. This can reduce the image response (e.g., a ~11% decrease) but preserves image resolution. The spectral information, which is the spectrum of incident illumination $R_j$, can then be processed using a unique pattern of pixel responses $I_i$.

As discussed above, the collected pixel response, $I_i$, is transformed by using an algorithm, using matrix $H_{ij}$ to find the spectrum of incident illumination $R_j$, e.g., from 430 nm to 570 nm with resolution of every 4 nm.

$$\begin{bmatrix} R_1 \\ \vdots \\ R_n \end{bmatrix} = \begin{bmatrix} H_{1,1} & \cdots & H_{1,m} \\ \vdots & \ddots & \vdots \\ H_{1,n} & \cdots & H_{n,m} \end{bmatrix} \times \begin{bmatrix} I_1 \\ \vdots \\ I_m \end{bmatrix}$$

There are m spectral pixels having m distinctive spectral responses, $I_1, I_2, \ldots I_m$. The light reflected from an object, e.g., a finger, and detected by these m spectral pixels comprises n spectral units, e.g., from 430 nm to 570 nm with resolution of every 4 nm, represented by the spectrum of incident illumination $R_1, R_2, \ldots R_n$. For example, a first spectral pixel will detect the spectrum of incident illumination $R_1, R_2, \ldots R_n$ collectively as $I_1$. A second spectral pixel will detect the spectrum of incident illumination $R_1, R_2, \ldots R_n$ collectively as $I_2$. Etc.

$$\text{Matrix } H = \begin{bmatrix} H_{1,1} & \cdots & H_{1,m} \\ \vdots & \ddots & \vdots \\ H_{1,n} & \cdots & H_{n,m} \end{bmatrix}$$

may be determined from calibration or filter design. The collected pixel response is $$I = \begin{bmatrix} I_1 \\ \vdots \\ I_m \end{bmatrix}$$

and is generated from the detected value of spectral pixels. These can then be used to calculate $$R = \begin{bmatrix} R_1 \\ \vdots \\ R_n \end{bmatrix}$$

which is the spectrum of incident illumination using $R_j = \Sigma_j H_{ij} I_j$. The computed spectrum of incident illumination $$R = \begin{bmatrix} R_1 \\ \vdots \\ R_n \end{bmatrix}$$

is a single composite value similar to a vector that is independent from the image pixels. It is not the color of an image pixel. The image pixels may have no color, e.g., black and white.

These spectrum of incident illumination $R_1, R_2, \ldots R_n$ are determined from the observation and can be compared with the known spectral content of a real finger, thus it is possible to determine whether the finger imaged is real or fake. The spectrum of incident illumination $$R = \begin{bmatrix} R_1 \\ \vdots \\ R_n \end{bmatrix}$$

may be considered a color or a spectral content of the finger incident illumination or any object captured by the image sensor.

Figure 10:
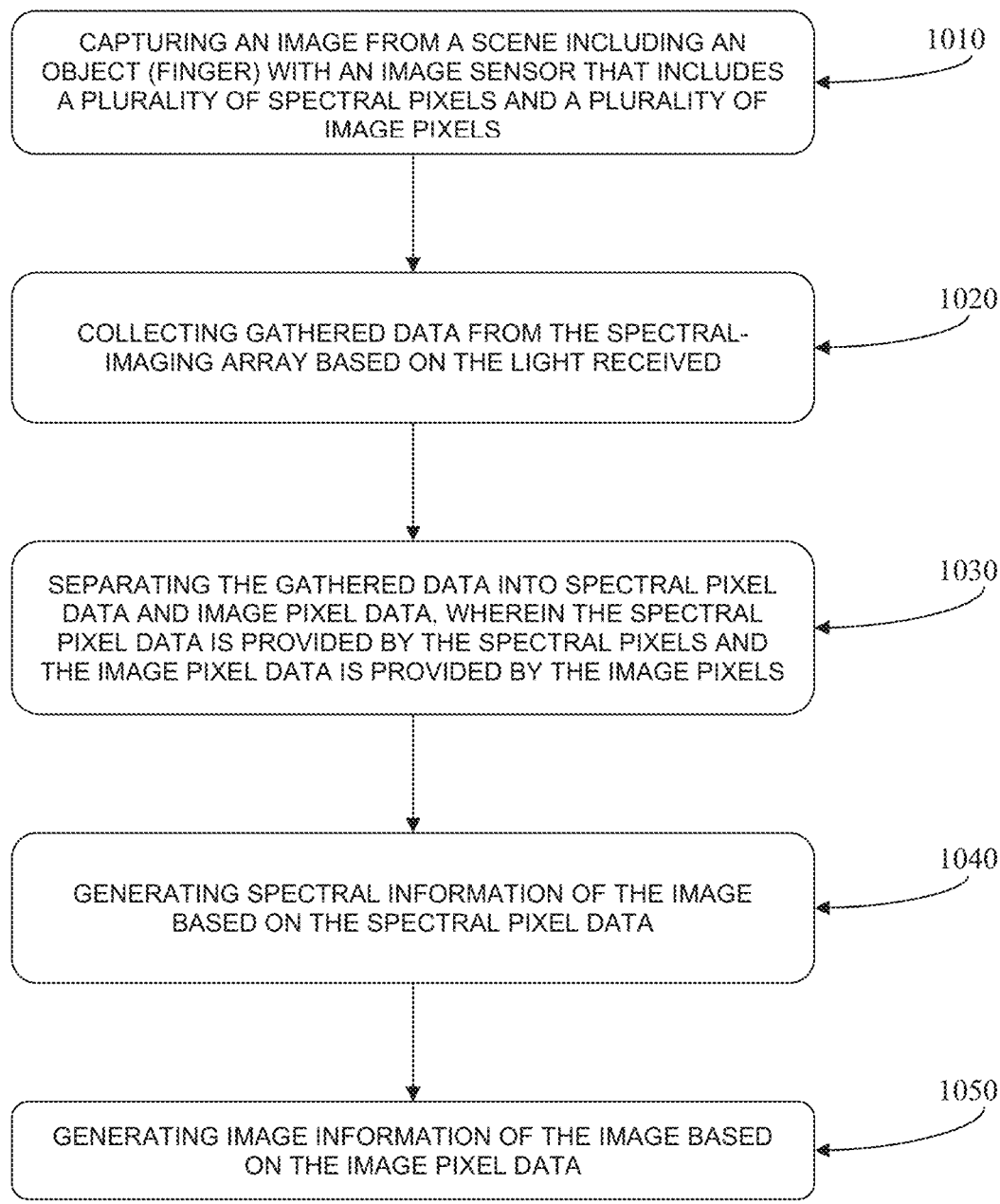
FIG. 10 illustrates an example of a logic flow diagram.

FIG. 10 is a logic flow diagram illustrating a method, and a result of execution of computer program instructions embodied on a memory, in accordance with an embodiment. At block 1010, the method includes capturing an image from a scene including an object, e.g., a finger, with an image sensor that includes a plurality of spectral pixels and a plurality of image pixels. Gathered data is collected from the spectral-imaging array based on the light received, at block 1020. At block 1030 the gathered data is separated into spectral pixel data and image pixel data, wherein the spectral pixel data is provided by the spectral pixels and the image pixel data is provided by the image pixels. At block 1040, spectral information of the image is generated based on the spectral pixel data and, at block 1050, image information of the image is generated based on the image pixel data. The generated image information is the processed image, e.g., from binning and/or filtering, and the generated spectral information is a single composite value representing the spectral content of the object captured by the image sensor. The generated spectral information may be the spectrum of incident illumination as discussed in the disclosure.

Figure 11:
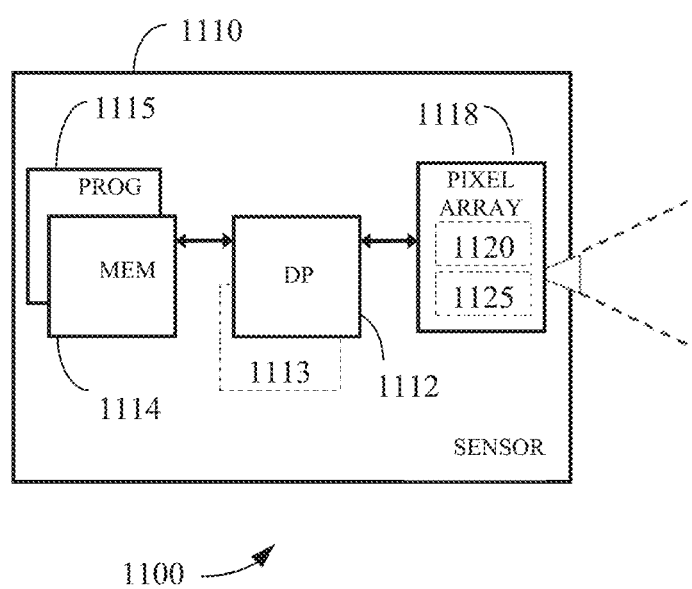
FIG. 11 shows an example of a block diagram of a device that is suitable for use in practicing various embodiments.

FIG. 11 shows a block diagram of a sensor that is suitable for use in practicing various embodiments. In the system 1100 of FIG. 11, sensor 1110 includes a controller, such as a data processor (DP) 1112, a computer-readable medium embodied as a memory (MEM) 1114 that stores computer instructions, such as a program (PROG) 1115, and a pixel array 1118. Pixel array 1118 includes a combination of image pixels 1120 and spectral pixels 1125. Sensor 1110 may also include a dedicated processor, for example image processor 1113.

Program 1115 may include program instructions that, when executed by DP 1112, enable sensor 1110 to operate in accordance with an embodiment, such as performing the method shown in FIG. 10. That is, various embodiments may be carried out at least in part by computer software executable by DP 1112 of sensor 1110, by hardware, or by a combination of software and hardware.

MEM 1114 may be of any type suitable to the local technical environment and may be implemented using any suitable data storage technology, such as magnetic memory devices, semiconductor-based memory devices, flash memory, optical memory devices, fixed memory and removable memory. DP 1112 may be of any type suitable to the local technical environment, and may include general purpose computers, special purpose computers, microprocessors and multicore processors, as non-limiting examples.

DP 1112 is configured to receive gathered data from the pixel array 1118 and separate the gathered data into spectral pixel data and image pixel data. The spectral pixel data is provided by the spectral pixels 1125 and the image pixel data is provided by the image pixels 1120. The DP 1112 is also configured to generate spectral information of the image based on the spectral pixel data and to generate image information of the image based on the image pixel data.

In some embodiments, MEM 1114 may include fingerprint data for an authorized user. Image processor 1113 may receive spectral information and image information from DP 1112 in order to compare against this fingerprint data stored in MEM 1114. If the received information matches the stored information, image processor 1113 can indicate that a user is authorized, e.g., the fingerprint matches.

An embodiment provides a method for collecting imager data. The method includes capturing an image from a scene with an image sensor. The image sensor has a plurality of spectral pixels and a plurality of image pixels. The method also includes collecting gathered data from the spectral-imaging array based on the light received. The gathered data is separated into spectral pixel data and image pixel data. The spectral pixel data is provided by the spectral pixels and the image pixel data is provided by the image pixels. The method includes both generating spectral information of the image based on the spectral pixel data, where the generated spectral information represents a spectral content of the object, and generating image information of the image based on the image pixel data.

In a further embodiment of the method above, each spectral pixel in the plurality of spectral pixels has a respective spectral response.

In another embodiment of any one of the methods above, separating the gathered data includes filtering the gathered data with a down sampling kernel to remove the spectral pixel data. Separating the gathered data may further include replacing the spectral pixel data from each of the plurality of spectral pixels with a weighted average of image pixel data from the image pixels surrounding the spectral pixel.

In a further embodiment of any one of the methods above, the method also includes determining whether a finger is authorized based at least in part on the spectral information and the image information. Determining a finger is authorized may include matching the spectral information and the image information to fingerprint data for the user. Determining a finger is authorized may also include determining if the finger is fake or real.

Another embodiment provides an image sensor. The image sensor includes a pixel array having a plurality of spectral pixels and a plurality of image pixels and a processor. The processor is configured to receive gathered data from the spectral-imaging array and separate the gathered data into spectral pixel data and image pixel data. The spectral pixel data is provided by the spectral pixels and the image pixel data is provided by the image pixels. The processor is also configured to generate spectral information of the image based on the spectral pixel data, where the generated spectral information represents a spectral content of the object, and to generate image information of the image based on the image pixel data.

In a further embodiment of image sensor above, the processor is further configured to output the spectral information and the image information.

In another embodiment of any one of the image sensors above, the processor is configured to simultaneously generate the spectral information and the image information.

In a further embodiment of any one of the image sensors above, each spectral pixel in the plurality of spectral pixels has an associated spectral response. For each nanostructure design of a plurality of nanostructure designs, at least one spectral pixel in the plurality of spectral pixels may conform to the nanostructure design. Thus, for each nanostructure design used there is at least one associated spectral pixel with an associated spectral response.

In another embodiment of any one of the image sensors above, the spectral-imaging array comprises an imaging area and a spectral gathering area, the imaging area comprises the plurality of image pixels and the spectral gathering area comprises the plurality of spectral pixels. The imaging area may define a circle centrally disposed on the spectral-imaging array and the spectral gathering area is outside the circle.

Various operations described are purely exemplary and imply no particular order. Further, the operations can be used in any sequence when appropriate and can be partially used. With the above embodiments in mind, it should be understood that additional embodiments can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared, and otherwise manipulated.

Any of the operations described that form part of the presently disclosed embodiments may be useful machine operations. Various embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The procedures, processes, and/or modules described herein may be implemented in hardware, software, embodied as a computer-readable medium having program instructions, firmware, or a combination thereof. For example, the functions described herein may be performed by a processor executing program instructions out of a memory or other storage device.

The foregoing description has been directed to particular embodiments. However, other variations and modifications may be made to the described embodiments, with the attainment of some or all of their advantages. Modifications to the above-described systems and methods may be made without departing from the concepts disclosed herein. Accordingly, the invention should not be viewed as limited by the disclosed embodiments. Furthermore, various features of the described embodiments may be used without the corresponding use of other features. Thus, this description should be read as merely illustrative of various principles, and not in limitation of the invention.

What is claimed is:

1. A method for collecting imager data, comprising:
capturing an image of an object with an image sensor having a spectral-imaging array with (a) a plurality of spectral pixels each covered by a color filter and (b) a plurality of image pixels each not covered by a color filter;
collecting, from the spectral-imaging array, gathered data indicative of light received;
separating the gathered data into spectral pixel data, provided by the plurality of spectral pixels, and image pixel data, provided by the plurality of image pixels, at least in part by replacing, for each of the plurality of spectral pixels, the spectral pixel data with a value calculated by a convolution kernel that (a) is centered at the spectral pixel and (b) has non-zero values at image pixels surrounding the spectral pixel;
generating spectral information of the image based on the spectral pixel data, the generated spectral information representing a spectral content of the object; and
generating image information of the image based on the image pixel data.

2. The method of claim 1, wherein each spectral pixel in the plurality of spectral pixels has a respective spectral response.

3. The method of claim 1, wherein the image comprises a finger and the method further comprises determining whether the finger is authorized based at least in part on the spectral information and the image information.

4. The method of claim 3, wherein determining whether the finger is authorized comprises matching the spectral information and the image information to fingerprint data for a user.

5. An image sensor comprising:
   a pixel array having a plurality of spectral pixels and a plurality of image pixels to provide spectral pixel data and image pixel data respectively; and
   a processor configured to:
      receive gathered data from the pixel array;
      separate the gathered data into spectral pixel data and image pixel data at least in part by replacing, for each of the plurality of spectral pixels, the spectral pixel data with a value calculated using a convolution kernel that is (a) centered at the spectral pixel and (b) has non-zero values at image pixels surrounding the spectral pixel;
      generate spectral information of the image based on the spectral pixel data, the generated spectral information representing a spectral content of an imaged object; and
      generate image information of the image based on the image pixel data.

6. The image sensor of claim 5, wherein the processor is further configured to output the spectral information and the image information.

7. The image sensor of claim 5, wherein the processor is configured to simultaneously generate the spectral information and the image information.

8. The image sensor of claim 5, wherein each spectral pixel in the plurality of spectral pixels has an associated spectral response.

9. The image sensor of claim 8, wherein, each spectral pixel in the plurality of spectral pixels conforms to a respective nanostructure design of a plurality of nanostructure designs having an associated spectral response.

10. The image sensor of claim 5, wherein the pixel array comprises an imaging area and a spectral gathering area, the imaging area comprises the plurality of image pixels and the spectral gathering area comprises the plurality of spectral pixels.

11. The image sensor of claim 10, wherein the imaging area defines a circle centrally disposed on the pixel array and the spectral gathering area is outside the circle.

12. The image sensor of claim 5, wherein the imaged object comprises a finger and the processor is further configured to determine whether the finger is authorized based at least in part on the spectral information and the image information.

* * * * *